Patented Aug. 5, 1941

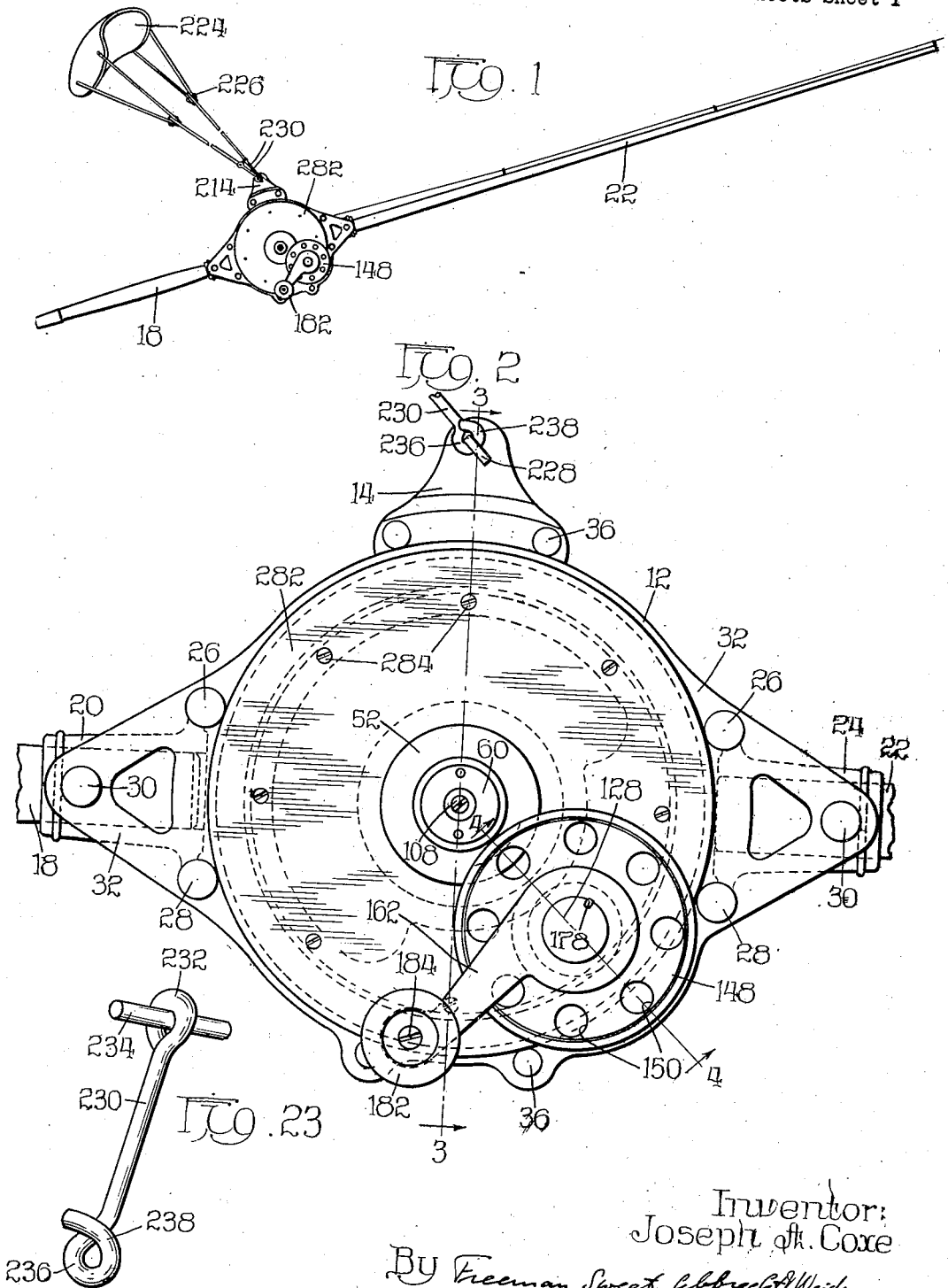

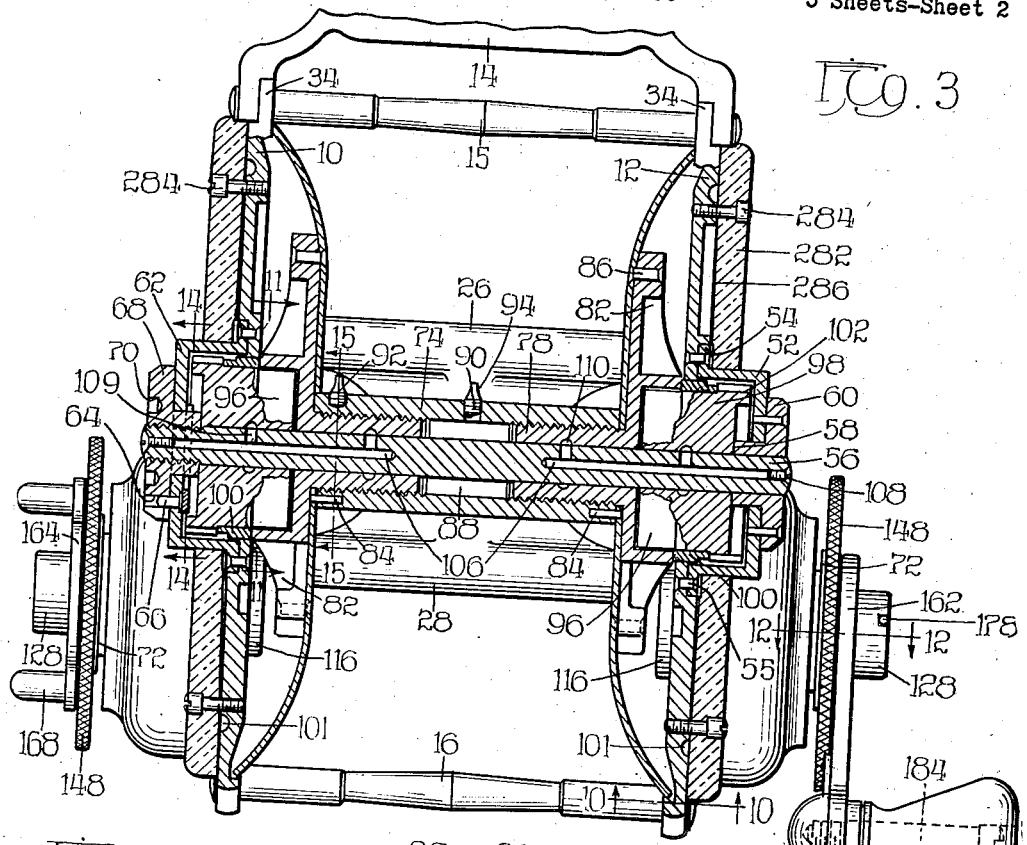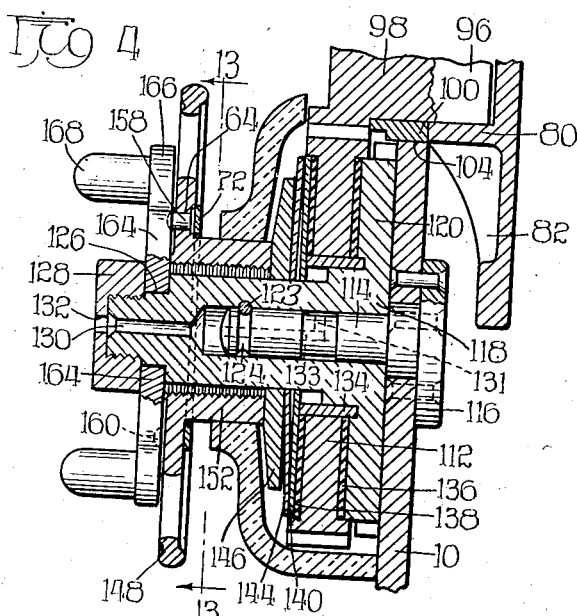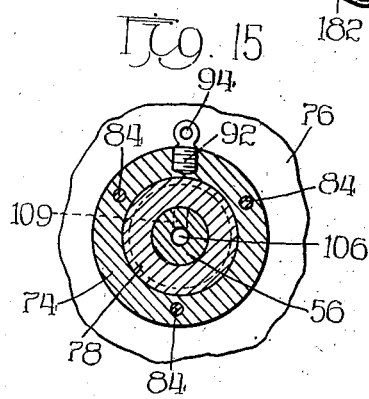

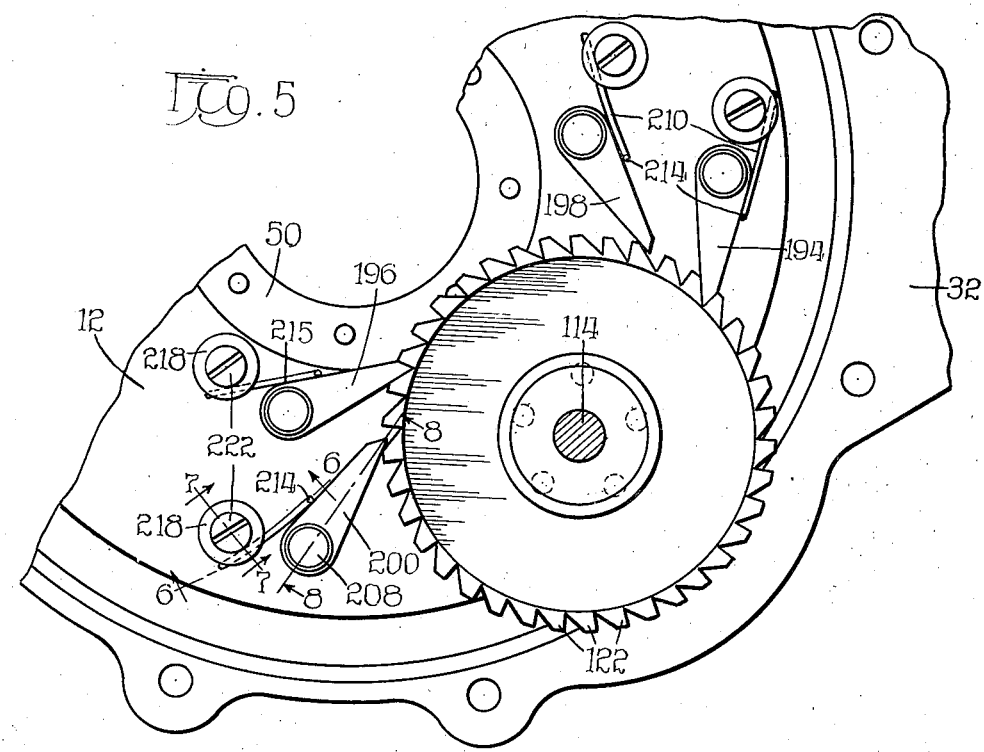
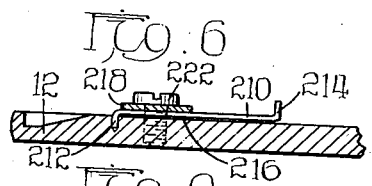
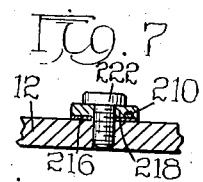
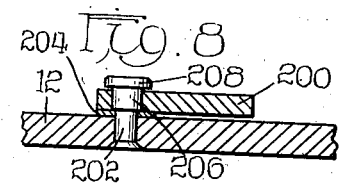
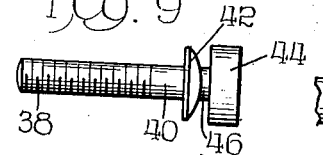
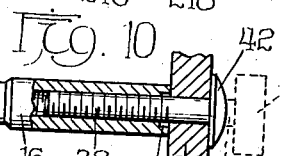
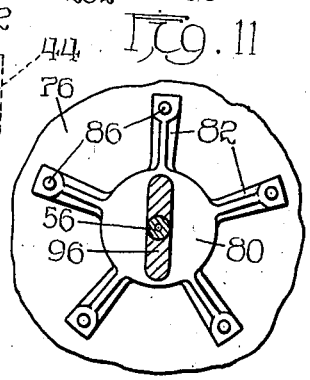
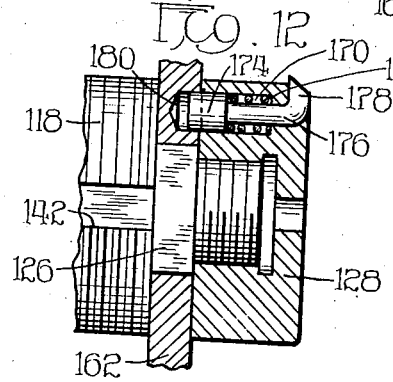

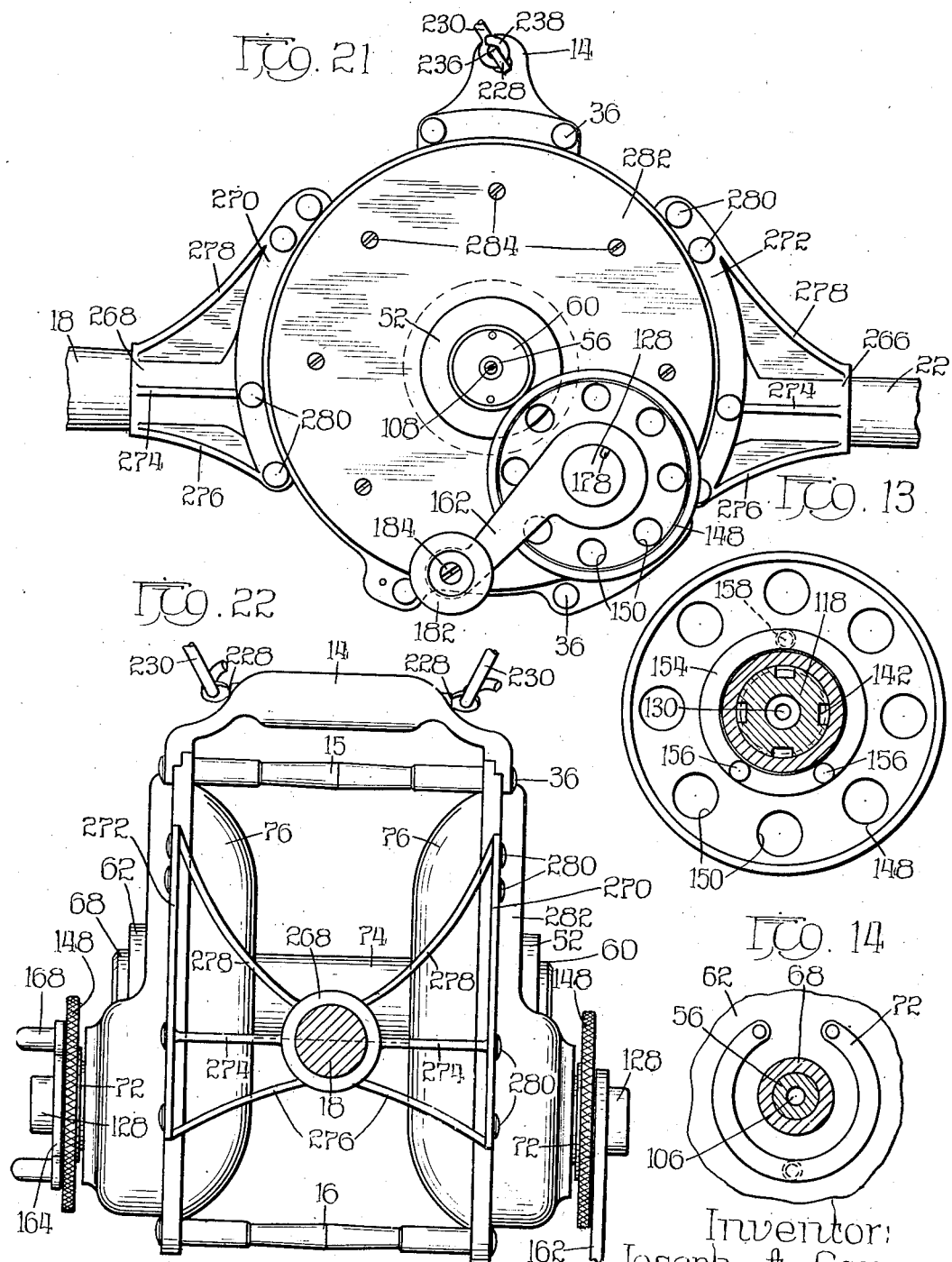

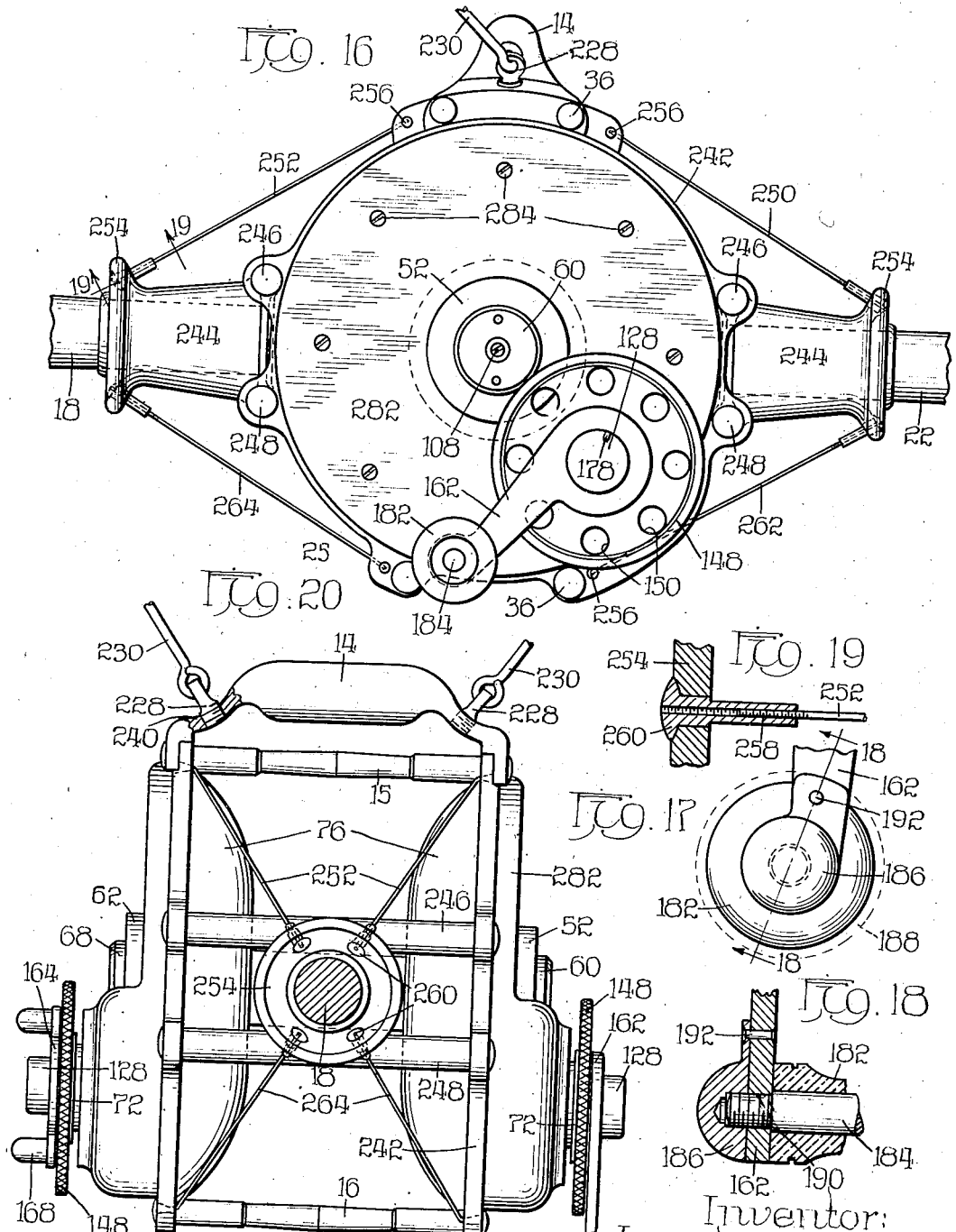

2,251,782

UNITED STATES PATENT OFFICE 2,251,782

FISHING REEL

Joseph A. Coxe, Los Angeles, Calif., assignor to Bronson Reel Company, Bronson, Mich., a corporation of Michigan Application November 4, 1936, Serial No. 109,099

5 Claims. (Cl. 242—84.5)

My invention relates to fishing reels, and includes among its objects and advantages an increase in the amount and controllability of the forces an angler can exert in playing a large fish, together with various advantageous structural details ancillary thereto. Further objects and advantages will become apparent as the description proceeds.

In the accompanying drawings:

Figure 1 is a side elevation of a rod and reel assembly;

Figure 2 is a side elevation on a larger scale of the reel of Figure 1;

Figure 3 is a section on line 3—3 of Figure 2;

Figure 4 is a partial section on line 4—4 of Figure 2 showing the control mechanism illustrated at the left side of Figure 3;

Figure 5 is a partial side view of the inside face of one of the side plates of the reel;

Figure 6 is a section on line 6—6 of Figure 5;

Figure 7 is a section on line 7—7 of Figure 5;

Figure 8 is a section on line 8—8 of Figure 5;

Figure 9 is a side elevation of a fastening screw;

Figure 10 is a section on line 10—10 of Figure 3;

Figure 11 is a partial end view of the spool as on line 11—11 of Figure 3;

Figure 12 is a section on line 12—12 of Figure 3;

Figure 13 is a section on line 13—13 of Figure 4, illustrating the drag wheel and associated position counter;

Figure 14 is a section on line 14—14 of Figure 3, illustrating the retaining means for the end nut on the cross bolt;

Figure 15 is a section of the spool shaft on line 15—15 of Figure 3;

Figure 16 is a side elevation of an alternative frame construction;

Figure 17 is an enlarged detail of the end of the crank;

Figure 18 is a section on line 18—18 of Figure 17;

Figure 19 is a section on line 19—19 of Figure 16;

Figure 20 is a front end elevation of the reel of Figure 16;

Figure 21 is a side elevation of another alternative type of frame;

Figure 22 is a front end elevation of the reel frame of Figure 21; and

Figure 23 is a perspective of a pig tail.

Frame

In the embodiment of the invention selected for illustration in Figures 1, 2, and 3, the frame of the reel is built up of side plates 10 and 12. These plates are cross-braced at the top by a combined handle and harness attachment member 14 and by a pair of pillars 15; and at the bottom by a pair of pillars 16.

The axis of the reel spool intersects the axis of the pole, which is made in two parts: a butt piece 18 entering the rear socket 20, and a tip 22 entering the front socket 24. Each of the sockets 22 and 24 comprises a tubular body having a tapered axial bore to receive the adjacent rod part, and three pillars arranged in triangular formation, including an upper pillar 26, a lower pillar 28, and an end pillar 30. Each side plate is provided with integral triangular extensions 32 abutting the ends of the pillars 26, 28, and 30. As illustrated, each end of the handle 14 abuts a cooperating flange 34 on the edge of the adjacent side plate.

Referring to Figures 9 and 10, the pillars 15, 16, 26, 28, and 30 are fastened to the side plates by threaded screws 36, each having a nonthreaded shank 40 fitting snugly in a cylindrical opening in the side plate and a convex head 42 to overlie the side plate. These fastening screws are originally made up as in Figure 9 with an enlarged head 44 spaced from the head 42 by a neck portion 46. In assembling the parts, as indicated in Figure 10, the head 44 is gripped in a lathe collet or suitable machine tool, with as much force as can safely be employed without danger of stripping the threads, which threads are of relatively great length to permit the application of a heavy force, and are machined to fit tightly. After the screw is driven home as in Figure 10, until the collet begins to slip, the head 44 and neck 46 are machined off, leaving the screw with a smooth head and making removal without cutting the parts to pieces practically impossible. The ends of the pillars 15 and 16 are counterbored as at 17 (see Figure 10) so that the screw threads will not interfere with getting a square abutment with a plane end surface on the pillar. This contributes materially to accuracy in manufacture and assembly.

Cross bolt mounting

Each of the plates 10 and 12 has a central opening and a shallow annular depression at 50 around that opening (see Figure 5). The right hand end cap 52 has a flange 54 fitting snugly in the depression 50 and securely fastened in place by rivets 55. The cross bolt 56 carries a head at one end defining an abutment shoulder 58 and an abutment flange 60 overlying the head of the cap 52. The head is integrally assembled on the bolt as by making it a press fit. The flange 60 is riveted to the cap 52, and the portion defining the shoulder 58 is a snug fit in the central opening in the cap 52. At the other side of the reel, the cap 62 is identical with the cap 52 except for the absence of rivet holes in the top and for the socket 64 for a lock pin 66. At this end the cross bolt 56 is threaded to receive a threaded nut 68 identical in general external contour with the integral head at the other end of the cross bolt. The nut 68 is provided with sockets 70 to receive a spanner wrench by means of which the parts may be assembled.

Referring to Figures 3 and 14, the nut 68 is assembled at the factory to allow the proper amount of end play for the parts, and then a hole is drilled in the nut to receive the locking pin 66, which is resiliently held in position by the U-shaped leaf spring 73 riveted against the inner face of the cap 62. To remove the nut 68, it is necessary to press the pin 66 in with a nail or bit of wire, and at the same time turn the nut 68 out of register with the pin 66.

Spool

The spool illustrated comprises the central tubular shaft 74 with both ends internally threaded, end bells 76, and the reinforcing spiders best illustrated in Figures 3 and 11. Each such spider includes a cylindrical hub 78 threaded into the sleeve 74, an enlarged female clutch member 80, and five radial bracing arms 82, all formed as a single integral casting. Before the spiders are threaded home, each end bell is riveted to the sleeve 74 by means of three rivets 84, see Figure 15. After the spiders are threaded home, the ends of the bracing arms 82 are riveted to the bells by rivets 86. The space at 88 between the hubs 78 provides an effective storage space for a packing of lubricant, such as heavy grease. The threaded plug 90 affords access to such space for filling purposes. A duplicate plug 92 is provided near one end of the sleeve 74, and both plugs 90 and 92 have their upper ends in the form of eyes 94 for the attachment of the line. In case the angler prefers to attach his line in some other way, or only to use one of the attachment means provided, the plug 92 can be removed altogether, or either plug may be replaced by one without the projecting eye 94.

Spool mounting and drive

The hub 78 has long bearing engagement with the cross bolt 56. Each female clutch member 80 has a central slot extending across most of its face and receiving the key 96 of the drive pinion 98. Each drive pinion 98 has a long bearing on the cross bolt 56 and is further guided by engagement on its outer periphery with a floating bearing ring 100. The portion of the gear engaging the bearing ring 100 is directly next the teeth 102 of the gear but of slightly less diameter so that the adjacent end of the bearing ring can have a continuous shoulder against which to abut. Each bearing ring 100 has direct rotary sliding engagement at 104 with the inner wall of the opening in the side plate 10 or 12. The inside diameter of the caps 52 and 62 is a few thousandths of an inch more than the diameter of the adjacent hole in the side plate so that no load is carried between the bearing ring 100 and the cap. Accordingly, there is a continuous series of abutment faces to take up any end play in the parts, but all these parts from one shoulder 58 to the corresponding shoulder on the nut 68 may rotate together. Proceeding from left to right in Figure 3, the abutment is from the nut 68 to the center of the left hand gear 98, from that gear to the left hand ring 100, from that to the adjacent clutch member 80, which is an integral part of the spool assembly, and then out from the other female clutch member 80 to the right hand floating ring 100, the right hand pinion 98, and the abutment 58. The spool assembly is symmetrical about its middle transverse plane so that it can be reversed end for end by separating the parts of the reel and reassembling them.

This reversibility combined with the double bearings for the pinions 98 contributes to long life against wear, and more materially to shock resistance in case the reel gets thrown around violently or strained by breaking of an abnormally heavy line. Any momentary load sufficient to flex the bolt 56 more than a few thousandths of an inch between its end mountings will transfer the load from the end mountings to the gears 98 and rings 100. This gives the bolt 56 reinforcement up close to the hubs 78 so that it can carry the load practically in shear at the planes of the outer ends of the hubs 78. Finally, any slight distortion of the parts as a result of mistreatment can be materially corrected by reversing the spool.

After the side plates 10 and 12 have been completely machined otherwise, I cut an annular groove at 101 in each of them. Such metal usually comes from the mill with a good deal of residual stresses in it left over from the rolling. The removal of parts of the metal in an irregular fashion relieves these stresses in an asymmetrical way and also may set up new stresses, all of which stresses tend to warp the plate out of a perfectly plane condition. The groove 101 cuts up the largest original surface area untouched by machining and materially relieves the unbalanced residual stresses in the plate.

The cross bolt 56 has end bores 106 to receive oil, which bores may be closed at their ends by screws 108. Adjacent the middle of each hub 78, I provide a radial outlet 109 and an annular groove 110 in the hub to distribute the oil. Similarly, about the middle of each pinion 98 I provide a duplicate oil groove 110 and radial outlet 109. The oil groove in the pinion is close to the plane of the key 96 so that the oil may spread from this point outwardly to the floating bearing 100 as well as axially back to the shoulder 58.

Control

Duplicate drive gears 112 mesh with the pinions 98, and these drive gears are associated with duplicate control means with the exception that the left hand control means is not provided with a crank handle. The caps 52 and 62 have segments cut away adjacent the gears 112 to permit the gears to mesh with the pinions 98. Referring to Figure 4, the stud shaft 114 carries an integral flange 116 suitably riveted to the side plate 10. On the shaft 114 rotates the tubular shaft 118. The large flange 120 at the bottom of the shaft 118 is provided with peripheral ratchet teeth 122, by means of which it may be restrained from rotating in the direction corresponding to paying out the line. The flange 120 has smooth sliding abutment with the adjacent side plate, being held by a retaining pin 123 driven into a cross bore in the shaft 114. Above the end of the stud shaft, the outer diameter of the shaft 118 is reduced and squared at 126 to receive either a crank, as on the right side of the reel, or a release grip, as on the left side of the reel. It is then further reduced and threaded to receive the fastening nut 128. The inner diameter of the shaft 118 is also reduced above the end of the stud shaft 114 to define an oil receiving opening 130 registering with a central opening 132 in the nut 128. Oil supplied at this point can also pass through the oil duct 131 to the annular storage space 133 formed by a slight reduction in the diameter of the stud shaft 114. The shaft 118 supports a floating ring bearing 134 engaging the web of the drive gear 112. Between the gear 112 and the flange 120 lies a friction washer 136. Above the gear 112 lies a duplicate friction washer 138. Above the washer 138 I position first a flat metal plate 140 keyed into four key ways 142 in the shaft 118; a similar metal washer 144 of slight concavity with its concave face facing the washer 140; and a thrust ring 146. The face of the thrust ring 146 adjacent the cupped washer 140 is plane, but the thickness of the thrust ring tapers slightly outward by reason of the conical shape of the opposite face of the ring. The control wheel 148 has a knurled periphery and a web lightened by a series of holes 150 which are also available for securing a better purchase on the wheel in case it should be jammed by an inexperienced user. The wheel is provided with an integral sleeve hub 152 extending down into abutment with the thrust ring 146.

For convenience in keeping track of the condition of adjustment of the wheel, particularly while playing a fish, I provide each wheel with a position counter best illustrated in Figures 4 and 13. The resilient ring 154 is riveted to the wheel web at 156 and has abutment at the opposite side of the wheel with the base of the counter pin 158. The instrumentality carried by the squared portion 126 of the shaft 118 is provided with a series of sockets 160 adapted to register with the pin 158. Accordingly, the operator can feel the movement of the pin from one socket to the next and make a mental note of the amount of adjustment made at any time so that if he wishes to return to the original adjustment he can move back the same number of notches.

The control elements so far described are identical on both sides of the reel with the sole exception that the flange 120 on the left has its teeth 122 inclined in the opposite direction.

On the right the squared portion 126 receives the crank 162 by means of which the angler may reel in the line whenever the line tension does not exceed the friction value for which the adjacent wheel 148 has been set.

On the left side the squared portion 126 carries only a circular plate 164 containing the sockets 160 and provided with a pair of diametrically opposite ears 166 equipped with short studs 168. When there is tension on the line, manipulation of the left hand control wheel 148 is directly effective, but when the line happens to be slack and it is desired to turn the left hand wheel 148 in the direction that would wind in the line, the pins 168 are available to hold the shaft 118 stationary and make such adjustment possible.

Both control wheels 148 are provided with right hand screw threads and, accordingly, in adjusting them while playing a fish, the left hand wheel will increase the tension when turned so that its upper edge moves toward the user, but the right hand wheel will increase the tension when its upper edge is moved from the user. This is the direction in which, in each instance, the user instinctively tends to move the wheel to tighten up.

The availability of two such adjustment means for alternative use materially improves the ability of the angler to handle a heavy fish, not only because of the additional braking surface available for the dissipation of energy, but for a specific manipulative advantage. It will be apparent that the angler can set the right hand wheel 148 to carry enough friction to reel in the line when slack or under relatively light tension, and then use the left hand wheel for as much additional friction as may be desired to oppose the run of the fish, up to the breaking strength of the line. This saves a surprisingly large amount of muscular exertion on behalf of the operator because an experienced angler usually takes the precaution to keep turning the crank 162 a little from time to time in spite of the slippage, so that the instant the fish turns, the angler's hand and arm are already in motion ready to start the reeling in process more promptly than would be physically possible otherwise. If these preparatory displacements had to be made against the total drag on the line, it will be obvious that many times greater muscular exertion would be required on the part of the operator for such maneuvering.

Referring to Figure 12, each of the nuts 128 is provided with an offset bore at 170 housing a small coil spring 172 which pushes downward on the plunger lock 174. The shank 176 of the lock is turned over at 178 to limit the downward movement. In assembly at the factory, the nut 128 is turned down to the position it should occupy and then its position is marked. The nut and the crank or release plate held by it are then removed, and a hole 180 is drilled in the release plate, after which the parts can be assembled as in Figure 12, and in no other relationship because the portion of the plunger 174 entering the hole 180 is slightly shorter than the pitch of the threads of the nut.

Referring to Figures 3, 17, and 18, the handle 182 turns freely on its pivot pin 184, which pin is threaded through the handle 162 and then enters the lock nut 186. This nut is first made up in the shape indicated at dotted lines at 188 in Figure 17, and with the pin 184 screwed in to bring the shoulder at 190 into abutment with the crank 162, the nut 186 is tightened to function as a lock nut. The contour of the adjacent face of the crank 162 is then traced and the nut 186 is removed, and the parts indicated in dotted lines at 188 in Figure 17 are trimmed off. Then the nut 186 is put back in the plate and fastened with a rivet 192.

In Figure 5 I have indicated an arrangement for assisting the stud shaft 114 to carry its load without distortion. The pawls 194 and 196 are located on opposite sides of the flange 100 and about 135° part, and positioned so that they both bottom simultaneously in the teeth 122. This provides three points of mechanical connection between the side plate and the flange, instead of two, and the distance between the two pawls is materially greater than the distance between either pawl and the shaft, thereby increasing the effective leverage of the connection and decreasing the shear load on the shaft 114.

To further reduce the shock when the flange 120 changes its movement from clockwise to counterclockwise, I provide two more pawls 198 and 200. In the position of Figure 5, the pawls 194 and 196 are bottomed, and the pawls 198 and 200 are halfway between their bottoming positions. Accordingly, the counterclockwise movement of the flange 100 before one or the other set of pawls is bottomed, is reduced by half.

Each of the pawls 194 is pivoted on a pin 202 riveted into the side plate and is slightly spaced from rubbing contact with the side plate as by a thin washer 204. The bearing portion 206 of the pin is a few thousandths longer than the thickness of the pawl 194 so that the pawl turns freely between the washer 204 and the head 208. Each of the pawls is urged into engagement with the teeth by a spring in the form of a straight piece of wire 210 having one end 212 turned down into a socket in the side plate and the other end 214 turned up to engage the side of the pawl. As clearly indicated in Figure 5, when the pawl is bottomed, the shank of the spring 210 engages the side of the pawl as clearly indicated at 215, so that the effective spring action on the pawl is substantially zero, but the lifting of the pawl immediately transfers the contact to the upturned end 214, as clearly shown in Figure 5 in connection with pawls 198 and 200. Each spring is clamped above a thin washer 216 by a thick clamping washer 218 grooved to receive the spring 210 and held down by a fastening screw 222 (see Figure 7).

*Harness*

In Figure 1 I have indicated diagrammatically a shoulder pad 224 adapted to engage the angler's shoulders and a set of straps 226 for connecting the pad to the handle 14. As illustrated in Figures 2, 21, and 22, the handle carries an attachment eye 228 and the harness terminates in a pig tail comprising the shank 230, with an eye 232 at its butt receiving the cross pin 234 for attachment to the harness strap. At its tip the shank 230 is bent at 236 substantially through a semi-circle lying in the plane of the shank 230, and then into a helix at 238 of substantially the same diameter as the semi-circle 236 and a pitch of approximately 45°. Upon reference to Figure 2, it will be observed that to release the pig tail the shank 230 must be rotated around the eye 228 in a clockwise direction for substantially 180° to wind the helical portion 238 out of the eye. Experience has shown that such a connection is not at all liable to accidental removal in ordinary use, but it is extremely convenient for quick assembly and separation, when that is desired.

In Figures 16 and 20, I have indicated the mounting of the eye 228 in the inclined flank portion 240 of the handle 14 with the pig tail positioned with the axis of the helix 238 in a plane at right angles to its position in Figure 2. Either position for the pig tail is equally effective.

*Tension braces*

In the modified form of frame illustrated in Figures 16, 19, and 20, the side plate 242 omits the triangular projections of Figure 2, and the sockets 244 for the rod butt and tip are each cast integral with two pillars only, an upper pillar 246 and a lower pillar 248. To further reinforce such a construction, tension braces are provided running downwardly at 250 and 252 from the edges of the side plates, and inwardly to connect to the lips 254 of the sockets. As illustrated, each such brace is similar to the spoke of an ordinary wire wheel having an enlarged head at 256, socketed in the edge of the side plate, and a threaded end at 258 entering the tightening nut 260. The upper braces 250 and 252 naturally carry most of the tension when playing a heavy fish, but they are preferably held taut when not under load by similar lower braces at 262 and 264.

*Cast webs*

In the modified frame construction of Figures 21 and 22, the sockets 266 and 268 are formed as part of a one piece casting including segmental side flange portions 270 and 272. From the socket the horizontal webs 274 extend laterally out to the flange portions 270 and 272, and these webs are further braced and strengthened by downwardly inclined webs 276 and upwardly inclined webs 278. The resulting cast spider has a very high degree of rigidity and at the same time is relatively light. It will be noted that in this embodiment the axis of the top 22 and butt 18 is slightly below the axis of the spool, and that ample clearance is allowed for winding the line on and off. Each of the flange portions 270 and 272 is riveted to the edge of the adjacent side plate as by rivets 280.

In all embodiments of the invention the Bakelite cover plates 282 have a snug fit on the caps 52 and 62, and a loose sliding fit around the sleeves 142. The inner surfaces of the plates are cut away to afford space for the mechanism covered thereby. The Bakelite cover plates are removably fastened to the side plates 10 and 12 by a series of fastening screws 284. In addition to the portions cut away to house the mechanism, the entire inner surface of each plate is slightly relieved as clearly indicated at 286 in Figure 3, so that the force of the fastening screws 284 is concentrated around the peripheral edge of the plate to maintain a tight and effective seal against moisture and dirt.

In all three frame embodiments the user can get a good grip on the handle 14 to steady himself while turning the crank, although most of the force exerted against the pull of the fish can come through the harness. The location of the handle 14 materially above the axis of the crank, as illustrated, makes this a natural and handy operation for the user, and affords him the best leverage for the exertion of his muscular strength. This is particularly true in the embodiment of Figure 21, where the axis of the rod is a little lower.

Considering the structure as a whole, it will be apparent that, in addition to the manipulative advantages previously discussed, all the parts that do not need to be taken apart at intervals for suitable cleaning and oiling, are permanently fastened so that the user can not take them apart. This is a material advantage, in that it checks the tendency of the user to play with the device by taking it apart unnecessarily, and limits such activity to the separation of parts that should take place at regular intervals to enable a conscientious user to keep his equipment in perfect condition.

Without further elaboration the foregoing will so fully explain my invention that others may, by applying knowledge current at the time of application, readily adapt the same for use under various conditions of service.

I claim:

1. A fishing reel comprising: side plates; a stationary shaft connected at its ends to said side plates; a spool between said side plates and rotatable on said shaft; said spool having spaced bearings on said shaft; and transmission mean for driving said spool including a drive pinion at both ends; each pinion having a bearing on said shaft closely adjacent one of said spool bearings; said pinions also having external bearings.

2. A fishing reel comprising: side plates; a stationary shaft connected at its ends to said side plates; a spool between said side plates and rotatable on said shaft; said spool having spaced bearings on said shaft; and transmission means for driving said spool including a drive pinion at both ends; each pinion having a bearing on said shaft; said pinions also having external bearings; said spool being symmetrical and reversible end for end; and said pinions being interchangeable.

3. In a hand driven fishing reel: side plates; pillars uniting said side plates into a rigid frame; a spool in said frame; a stationary cross shaft supporting said spool; mean for driving said spool including a pinion journaled interiorly on said shaft and exteriorly in a side plate; driving mechanism connected to said pinion and entirely supported on said side plate on the side remote from said spool; central housing means for said pinion rigid with said side plate and supporting the adjacent end of said cross shaft; a Bakelite cover plate centered on said housing and fastened to said side plate; and rotary manual actuating and control means coaxial with a portion of said drive mechanism on an axis offset from the axis of said spool; said actuating and control means extending outside said cover; said cover having an offset aperture coaxial with said actuating and control means and encircling but not supporting the same.

4. In a fishing reel of the type supported by a harness over the shoulders of the user: a frame and a spool journaled in said frame; and independent braking means in said frame at opposite sides thereof; each braking means including an adjusting and holding element large enough to be gripped by the user for holding the reel and rod in place as well as for adjusting the friction; said frame including rod sockets arranged with the rod axis passing near the center of the frame; said frame having harness clips located above the rod axis; both said adjusting and holding elements being located below the rod axis.

5. In a fishing reel of the type supported by a harness over the shoulders of the user: a frame and a spool journaled in said frame; and independent braking means in said frame at opposite sides thereof; each braking means including an adjusting and holding element large enough to be gripped by the user for holding the reel and rod in place as well as for adjusting the friction; said frame including rod sockets arranged with the rod axis passing near the center of the frame; said frame having harness clips located above the rod axis.

JOSEPH A. COXE.